US008982432B2

(12) United States Patent
Murakami

(10) Patent No.: US 8,982,432 B2
(45) Date of Patent: Mar. 17, 2015

(54) ORIGINAL READING APPARATUS FOR READING IMAGE OF AN ORIGINAL

(71) Applicant: Canon Kabushiki Kaisha, Tokyo (JP)

(72) Inventor: Ayumu Murakami, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/827,586

(22) Filed: Mar. 14, 2013

(65) Prior Publication Data

US 2013/0278976 A1     Oct. 24, 2013

(30) Foreign Application Priority Data

Apr. 18, 2012   (JP) .................................. 2012-095020

(51) Int. Cl.
*H04N 1/04*   (2006.01)
*H04N 1/00*   (2006.01)

(52) U.S. Cl.
CPC ................................ *H04N 1/00559* (2013.01)
USPC ............ 358/484; 358/475; 358/482; 358/483

(58) Field of Classification Search
USPC ......... 358/484, 475, 482, 483, 512–514, 509; 250/208.1, 239, 216, 234–236; 399/211, 212
See application file for complete search history.

(56) References Cited

U.S. PATENT DOCUMENTS

| 7,463,392 | B2 | 12/2008 | Yamamoto et al. | 358/496 |
|---|---|---|---|---|
| 7,515,312 | B2 | 4/2009 | Murakami et al. | 358/461 |
| 7,755,812 | B2 | 7/2010 | Oshida et al. | 358/496 |
| 7,847,983 | B2 | 12/2010 | Murakami | 358/474 |
| 7,903,298 | B2 * | 3/2011 | Sawada et al. | 358/484 |
| 8,064,105 | B2 | 11/2011 | Murakami et al. | 358/461 |
| 8,194,294 | B2 * | 6/2012 | Tagawa et al. | 358/475 |
| 8,325,392 | B2 * | 12/2012 | Tagawa et al. | 358/475 |
| 8,422,073 | B2 | 4/2013 | Murakami et al. | 358/1.9 |
| 2008/0112166 | A1 | 5/2008 | Kakizaki et al. | 362/245 |
| 2011/0228353 | A1 * | 9/2011 | Okamoto | 358/475 |
| 2013/0321879 | A1 * | 12/2013 | Takahashi | 358/474 |

FOREIGN PATENT DOCUMENTS

JP       4788577 B     10/2011

OTHER PUBLICATIONS

U.S. Appl. No. 13/827,386, filed Mar. 14, 2013; Inventor: Ayumu Murakami.

* cited by examiner

*Primary Examiner* — Cheukfan Lee
(74) *Attorney, Agent, or Firm* — Fitzpatrick, Cella, Harper & Scinto

(57) ABSTRACT

A light guide includes a plurality of boss portions. A round hole portion is provided near the center of a base member for fixing the light guide, and slit portions are provided on both ends thereof. The round hole portion supports one boss portion in both the longitudinal direction and the lateral direction of the light guide. The slit portions support boss portions in the lateral direction of the light guide, but are free in the longitudinal direction of the light guide. That is, the center of the light guide is fixed from both directions, and thus both ends of the light guides can expand away in the longitudinal direction. This cuts the influence of expansion by half.

16 Claims, 16 Drawing Sheets

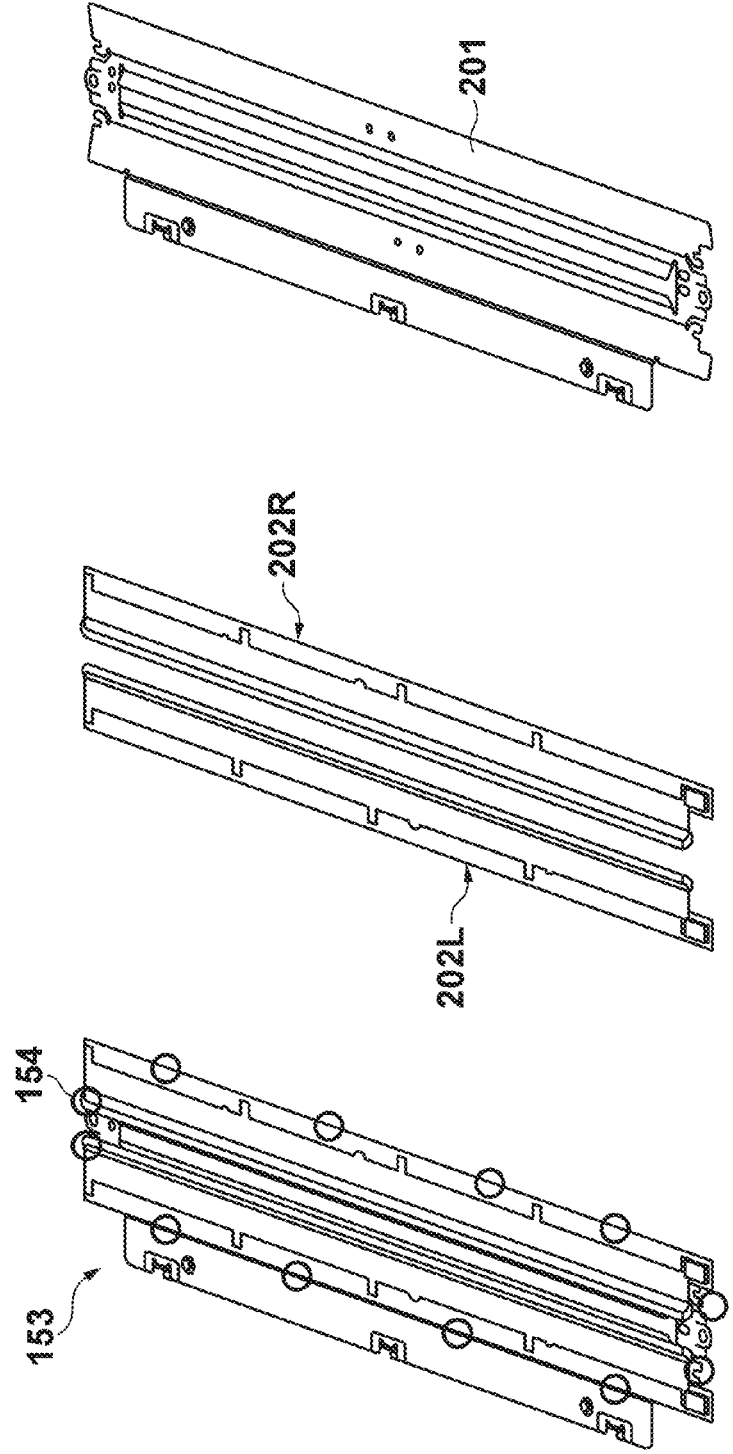

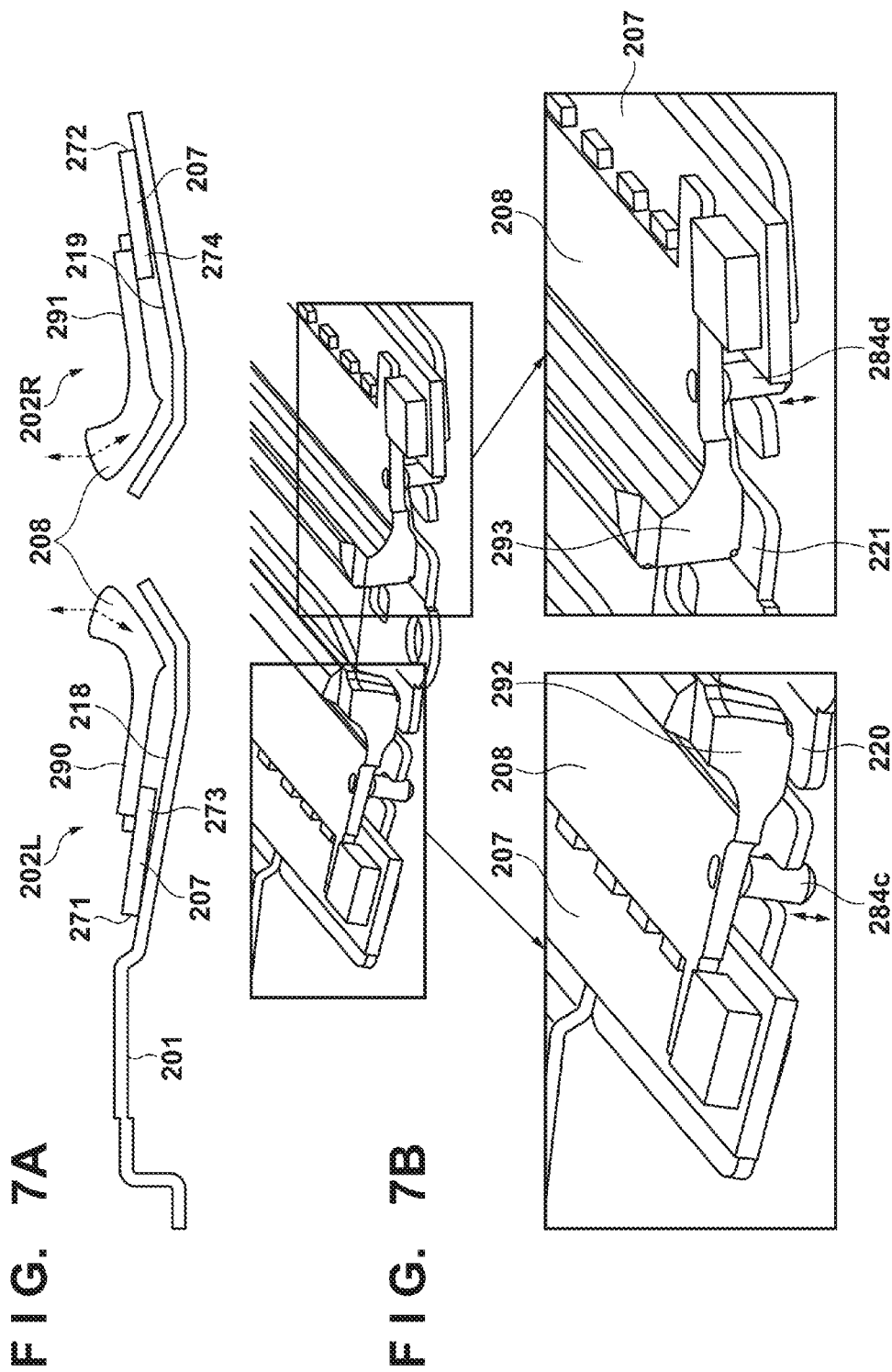

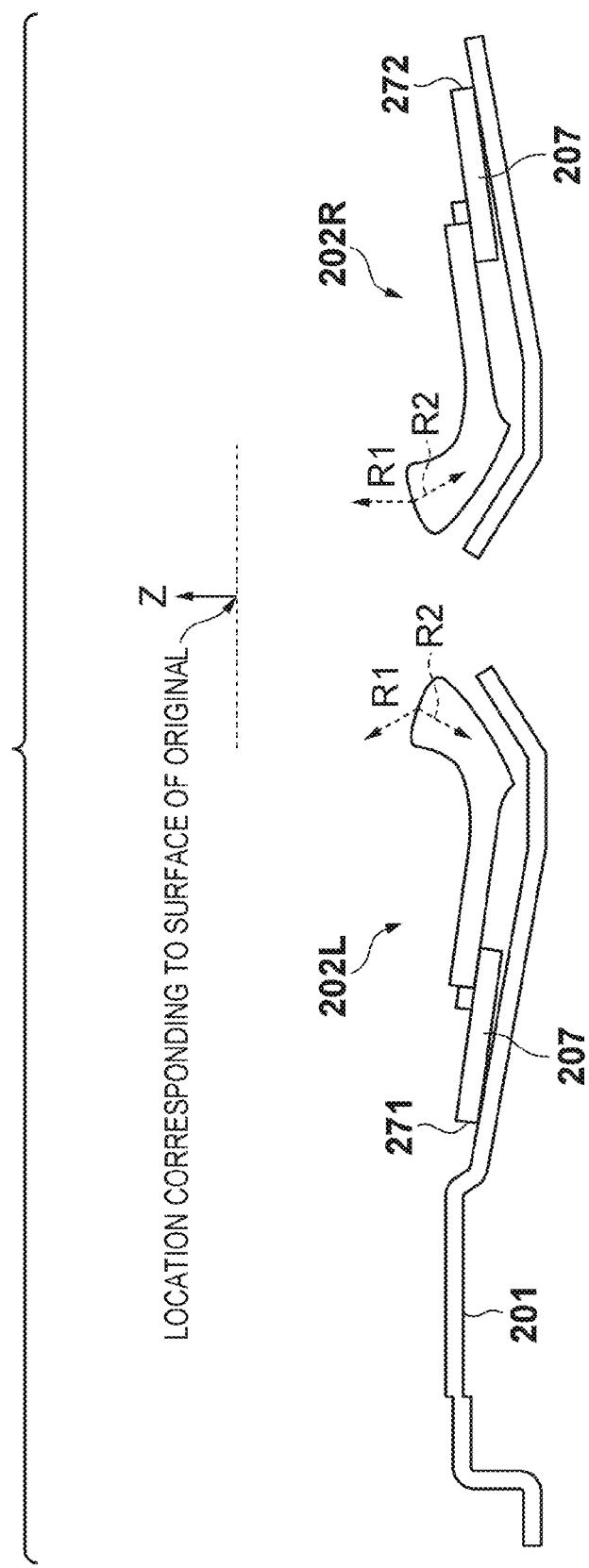

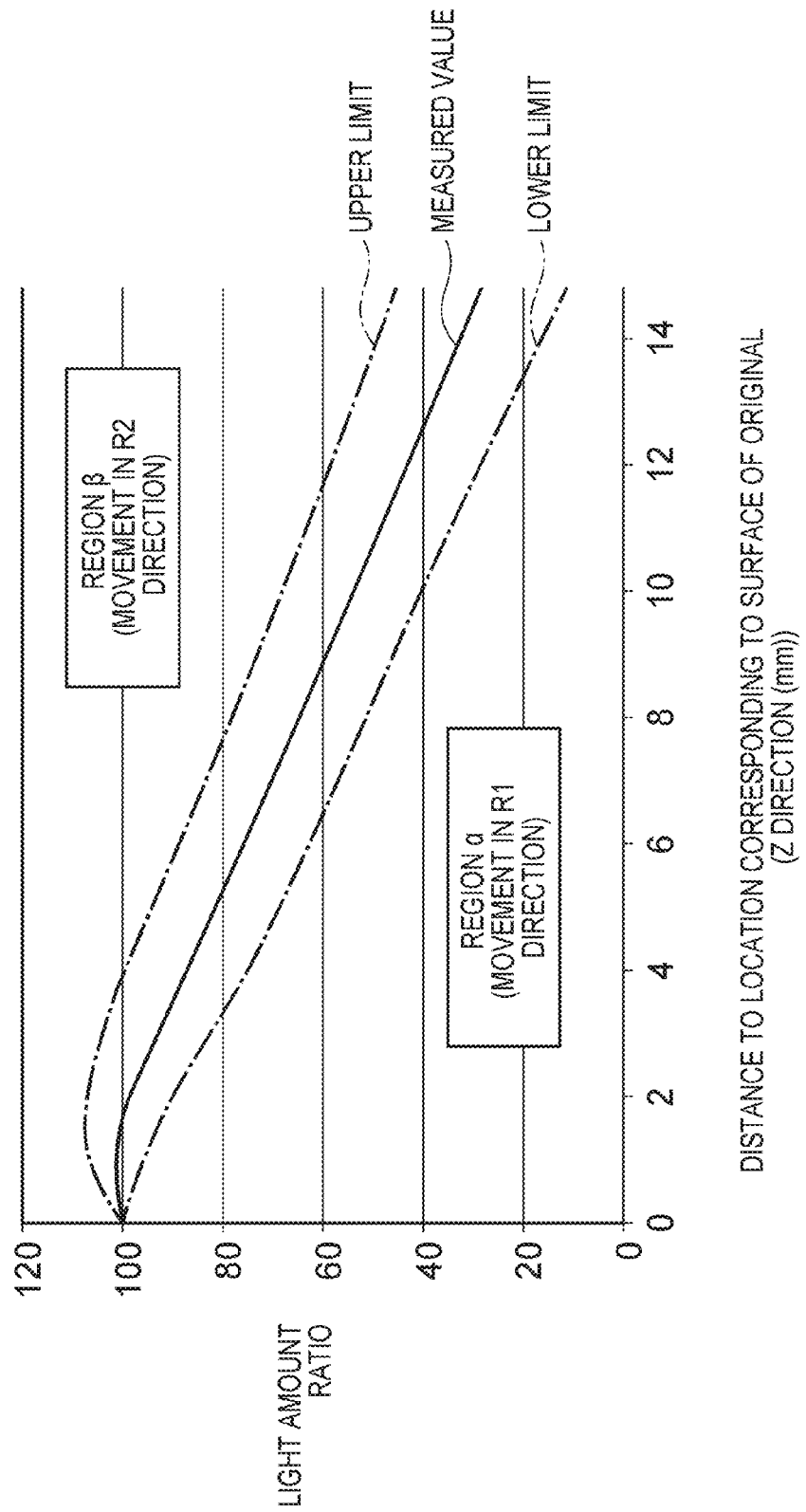

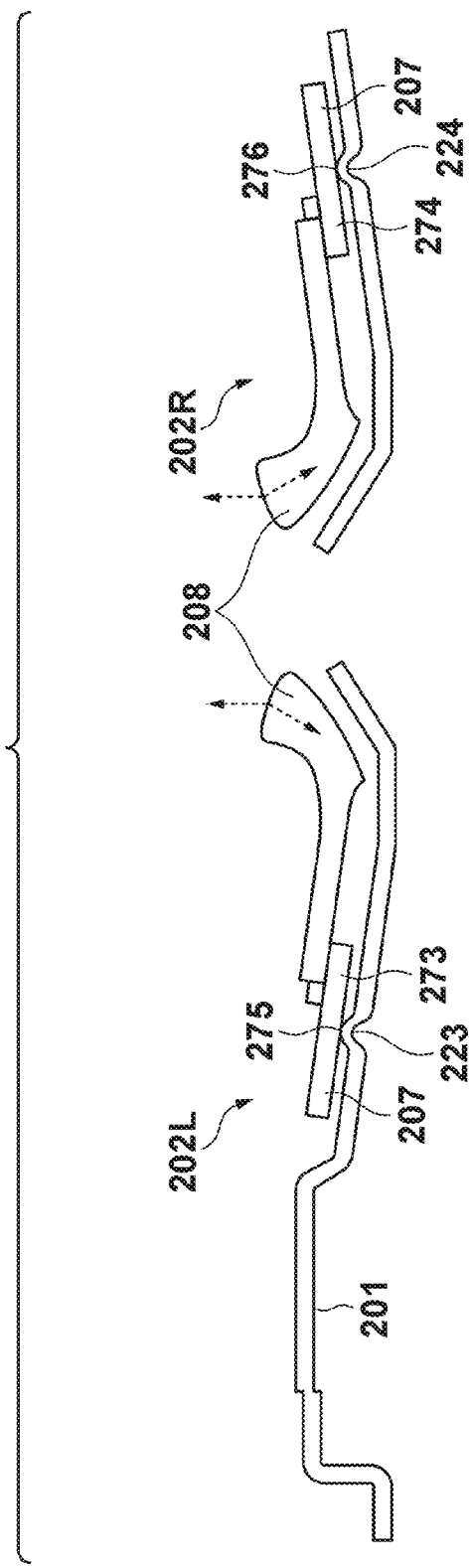

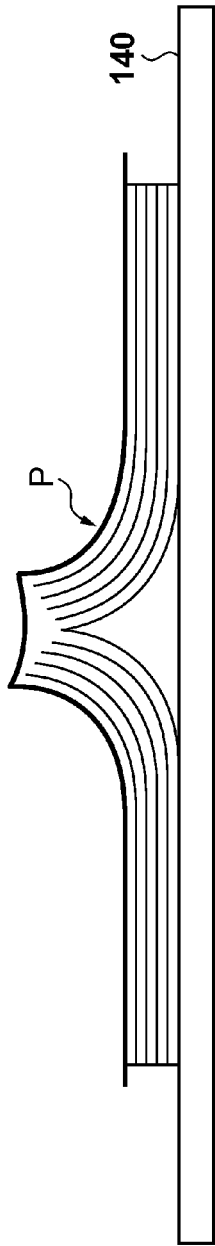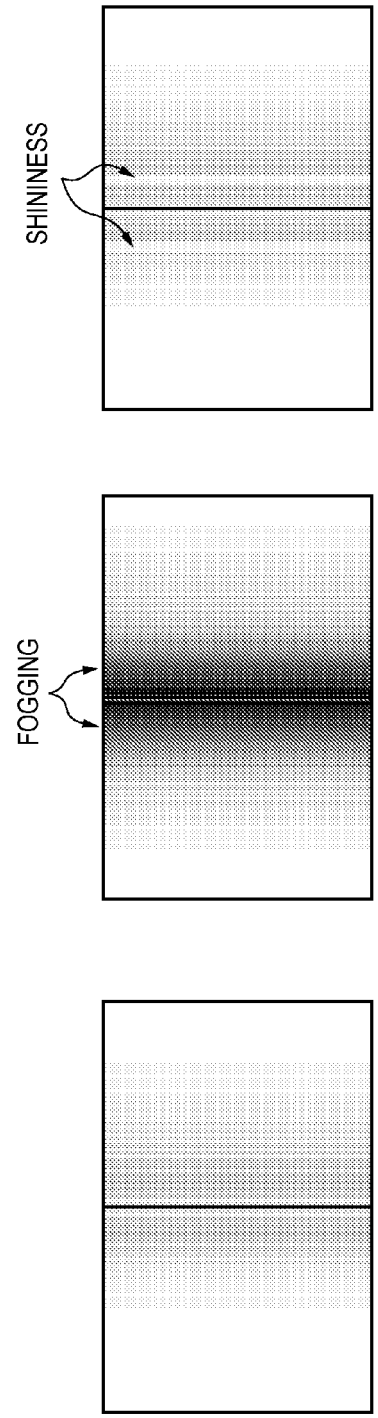
FIG. 16A (RELATED ART)
FIG. 16B (RELATED ART)
FIG. 16C (RELATED ART)
FIG. 16D (RELATED ART)

ORIGINAL READING APPARATUS FOR READING IMAGE OF AN ORIGINAL

BACKGROUND OF THE INVENTION

1. Field of the Invention

The present invention relates to original reading apparatuses for reading images of originals.

2. Description of the Related Art

Original reading apparatuses such as copy machines, facsimiles, image scanners, and so on typically read an image of an original by illuminating the original, which has been placed on a platen glass. Japanese Patent No. 4788577 discloses mounting a plurality of LEDs upon a long, thin printed wiring board in the longitudinal direction thereof, and illuminating an original by converging the light from the plurality of LEDs using a light guide.

However, the invention disclosed in Japanese Patent No. 4788577 does not disclose the manner in which the light guide is attached to a base member. Research performed by the inventors of the present application has shown that shininess, fogging, and so on occur in an image when the light guide expands due to heat. FIGS. 16A to 16D illustrate an example of fogging and shininess occurring when reading a spread thick original such as a book or the like. As shown in FIG. 16A, when a spread thick original P is placed upon a platen glass 140, the central area of the original is distanced from the platen glass 140. As shown in FIG. 16B, the reading result designed to be obtained is obtained in the case where the light guide is not warped. However, if the light guide is warped, there are cases where fogging will occur in the center of the image, as shown in FIG. 16C, or shininess will occur in the vicinity of the center of the image, as shown in FIG. 16D.

SUMMARY OF THE INVENTION

The present invention reduces the occurrence of fogging, shininess, and so on when a light guide has expanded due to heat.

An embodiment of the present invention provides an original reading apparatus comprising the following element. A platen on which an original is placed. An illumination unit is configured to illuminate the original. A photoelectric conversion element is configured to convert reflected light from the original illuminated by the illumination unit into an electrical signal. The illumination unit may include the following elements. A base member. A light guide has a first boss portion and second boss portions that engage with the base member, and is configured to guide light emitted from the plurality of light-emitting elements toward the original. The first boss portion is arranged in a central area of the light guide is supported in both the longitudinal direction and the lateral direction of the light guide. The second boss portions are arranged on the ends of the light guide are free in the longitudinal direction of the light guide and are supported in the lateral direction of the light guide.

Further features of the present invention will become apparent from the following description of exemplary embodiments (with reference to the attached drawings).

BRIEF DESCRIPTION OF THE DRAWINGS

FIGS. 3A, 3B, and 3C are diagrams illustrating an illumination unit.
FIGS. 7A and 7B are diagrams illustrating a state in which the base member and the light guide unit have been combined.
FIGS. 8A and 8B are diagrams illustrating how the position of the light guide unit relative to the base member is adjusted.
FIG. 9 is a diagram illustrating a state in which the base member and the light guide unit have been combined.
FIGS. 16A, 16B, 16C, and 16D are diagrams illustrating fogging and shininess.

DESCRIPTION OF THE EMBODIMENTS

Figure 1:
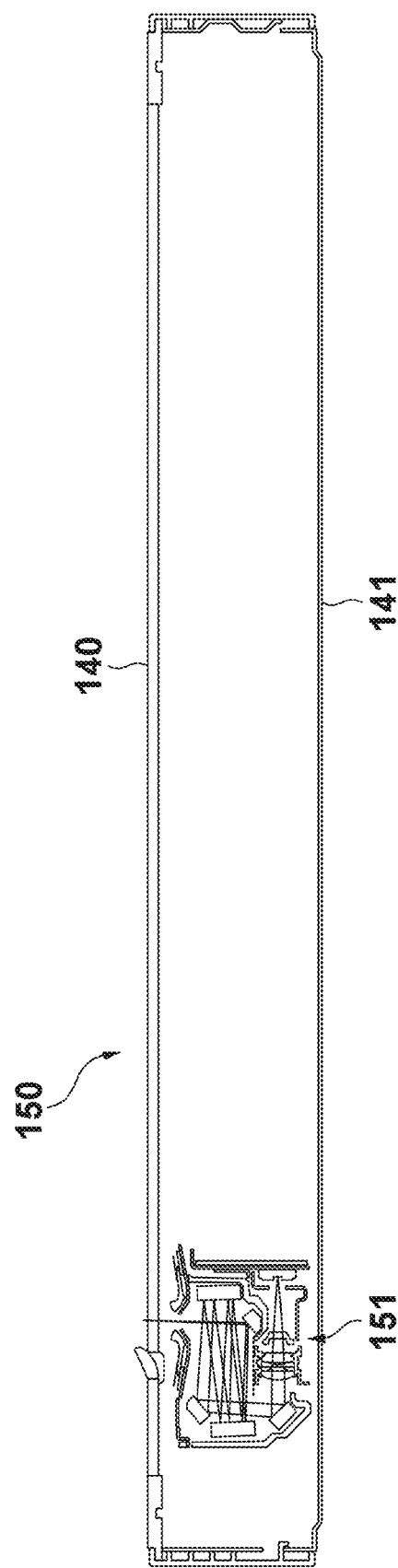
FIG. 1 is an overall cross-sectional view of a reader section.

As shown in FIG. 1, a reader section 150 of an original reading apparatus includes an optical box 151, a reader frame 141, and a platen glass 140. The optical box 151 is linked to a motor (not shown) via wires (also not shown), and due to rotation of the motor, moves parallel to the platen glass 140. Through this, the optical box 151 optically scans an original placed upon the platen glass 140 in a sub scanning direction. Accordingly, the sub scanning direction is parallel to the direction in which the optical box 151 moves.

Figure 2:
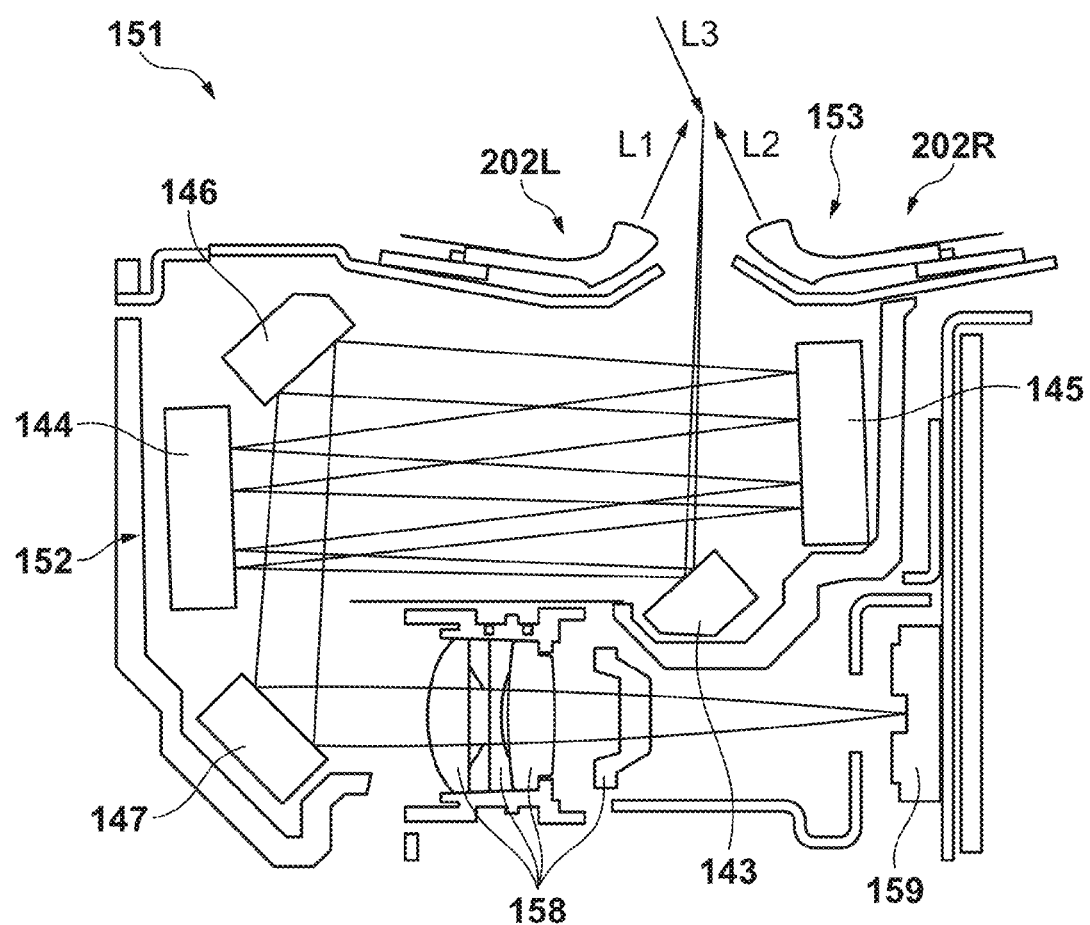
FIG. 2 is an overall cross-sectional view of an optical box.

As shown in FIG. 2, the optical box 151 includes a box frame 152 that supports optical components and the like. An illumination unit 153 illuminates a surface of the original to be read. The illumination unit 153 includes two light guide units 202L and 202R. Light L1 output from the light guide unit 202L and light L2 output from the light guide unit 202R are reflected by the surface of the original to be read. Reflected light L3 from the original forms an image on a CCD 159 via mirrors 143, 144, 145, 146, and 147 and a plurality of lenses 158. The CCD 159 is a photoelectric conversion element, and receives the reflected light L3 based on an image in the original, converts the received light to an electric signal, and outputs the signal as an electronic image signal.

FIG. 3A illustrates the illumination unit 153 as a whole. The illumination unit 153 includes a base portion (base member) 201, shown in FIG. 3C and configured of a metallic plate member, and the light guide units 202L and 202R shown in FIG. 3B. The light guide units 202L and 202R are positioned relative to the base member 201 and fixed thereupon when assembling the illumination unit so that the optical axis of the light L1 output from the light guide unit 202L and the optical axis of the light L2 output from the light guide unit 202R are each in desired positions. By adjusting the positions of the light guide units 202L and 202R relative to the base member 201 as appropriate, the optical axis of the light L1 and the optical axis of the light L2 can be adjusted, making it possible to suppress the occurrence of shininess, fogging, and so on by setting the light amount at an original reading position to a desired light amount. Circles 154 in FIG. 3A indicate positions where a UV adhesive is applied.

Figure 4A:
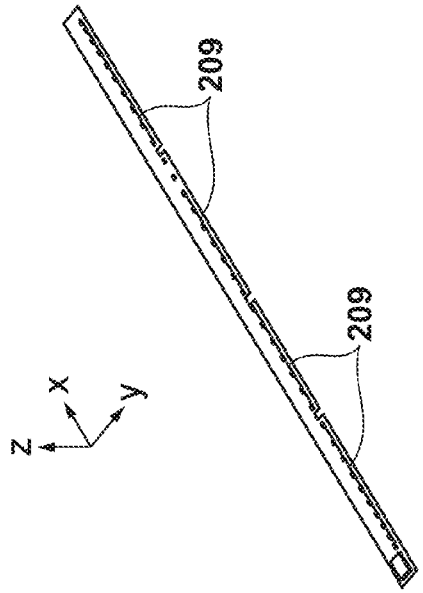
FIGS. 4A, 4B, 4C, and 4D are diagrams illustrating a light guide unit.

FIGS. 4A through 4D illustrate the light guide unit 202L. As shown in FIG. 4A, an LED substrate 207 includes a plurality of LEDs 204 mounted along a straight line, a metallic plate member 205, and a connector portion 206 that is connected to the LEDs via electrical wires.

The LED substrate 207 is configured of a metal because metal accelerates the dissipation of heat and suppresses a rise in the temperature of the LEDs. Note that a thermally conductive sheet, a silicone paste, or the like may be arranged between the top surface (contact surface) of the plate member 205 and the bottom surfaces (contact surfaces) of the plurality of LEDs 204 in order to accelerate the dissipation of heat. For example, aluminum, which has excellent heat dissipation properties and processability, can be used as the material of the plate member 205. A substrate configured of another metal may be employed as the plate member 205 as long as the metal is a material capable of efficiently dissipating heat from the plurality of LEDs 204 (examples: an aluminum alloy, iron, copper, stainless steel). The plurality of LEDs 204 are mounted as an array (in a single straight line) along the longitudinal direction (x direction) of the plate member 205. That is, the plurality of LEDs 204 are mounted in array form. Thus the longitudinal direction is the direction parallel to the direction in which the plurality of LEDs 204 are laid out. The direction in which light is output from each of the plurality of LEDs 204 is a y-axis direction. The y-axis direction can also be called the lateral direction, and is a direction orthogonal to the direction in which the plurality of LEDs 204 are laid out. The connector portion 206 that is connected to wiring for supplying power to the plurality of LEDs 204 is provided at an end of the plate member 205 in the longitudinal direction thereof.

Figure 4B:
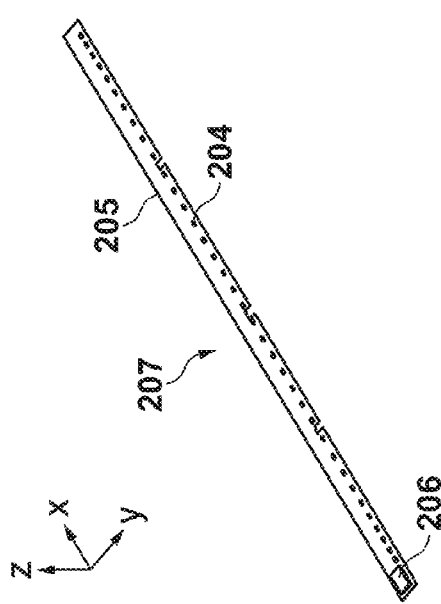

As shown in FIG. 4B, double-sided tape 209 is affixed to the end of the LED substrate 207 on which the LEDs 204 are mounted when assembling the LED substrate 207. This double-sided tape 209 is an adhesive member for applying and fixing a light guide 208 to the plate member 205.

The double-sided tape 209 has a long, thin shape following the longitudinal direction of the LED substrate 207. The light guide 208 is fixed upon the LED substrate 207 using the double-sided tape 209 so that light-emitting surfaces 241 of the plurality of LEDs 204 and a light-entry surface 281 of the light guide 208 face each other and are close to each other. The longitudinal direction of the light guide 208 matches the direction which the plurality of LEDs 204 are laid out. The light guide 208 is configured of a light-transmissive plastic such as an acryl, FRP, or the like. Because the light guide 208 is applied and fixed to the LED substrate 207, which is configured of a metallic plate member that is more rigid than the plastic light guide, it is possible to correct warping in the light guide 208 if such warping has occurred.

Figure 4C:
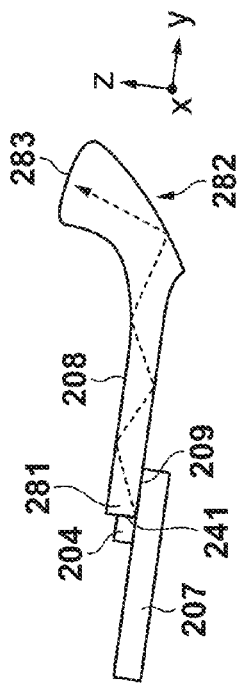

FIG. 4C illustrates a state in which the light guide 208 has been fixed upon the LED substrate 207. The plurality of LEDs 204 are side view-type LEDs whose light-emitting surfaces 241 face the light guide 208.

Figure 4D:
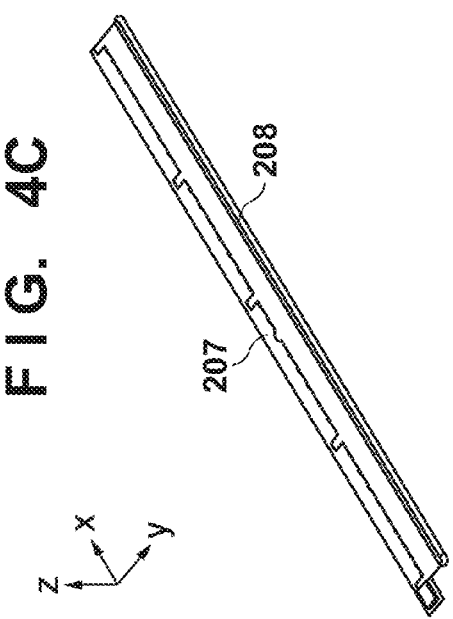

As shown in FIG. 4D the light guide unit 202L is a unit that integrates the LED substrate 207 having the metallic plate member 205, the plurality of LEDs 204, and the light guide 208. The light guide unit 202R has the same configuration. The light guide 208 is arranged upon the plate member 205 so that the light-entry surface 281 of the light guide 208 faces the light-emitting surfaces 241 of the plurality of LEDs 204.

As indicated by the dotted line in FIG. 4D, light emitted from the plurality of LEDs 204 enters from the light-entry surface 281, is reflected within the light guide 208 (by a border surface such as a reflecting portion 282), and is emitted from a light exit portion 283. Accordingly, the light guide 208 functions as a light guiding member that guides light output from the LEDs 204, which correspond to a plurality of light-emitting elements, toward the original.

As shown in FIG. 2, the light guide units 202L and 202R have shapes that are symmetrical relative to the optical axis of the reflected light L3. Accordingly, the same component can be used for the light guide 202L and the light guide 202R, and thus the light guide units can be mass-produced as identical components.

Adjusting the positions of the light guide units 202L and 202R relative to the base member 201, and fixing the light guide units 202L and 202R onto the base member 201, will be described using FIGS. 5 through 7B.

Figure 5:
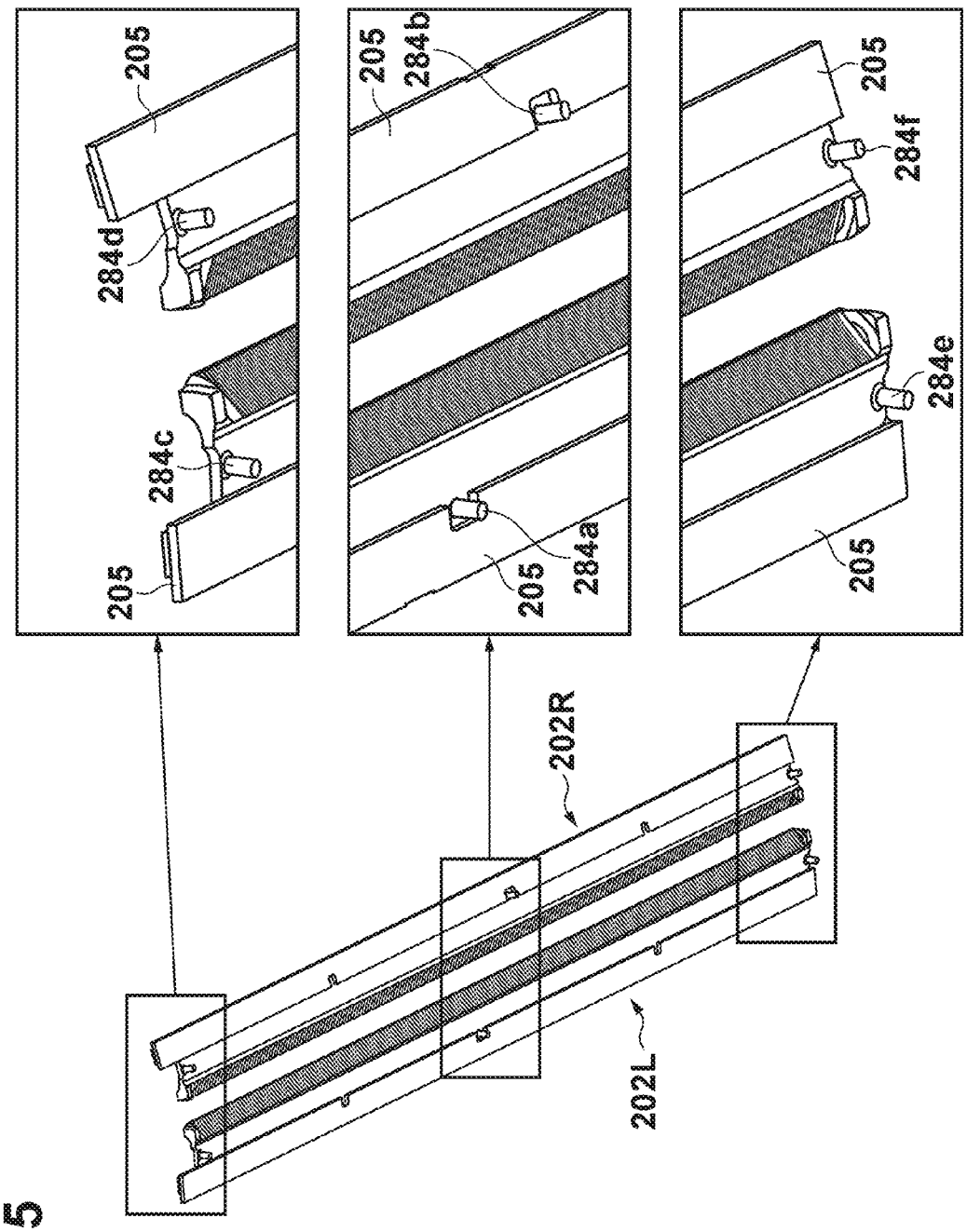
FIG. 5 is a perspective view illustrating a bottom surface of the light guide unit.

FIG. 5 is a perspective view illustrating the light guide units 202L and 202R from the bottom surfaces thereof. In FIG. 5, a plurality of bosses used for positioning are provided in the light guides 208 of the light guide units 202L and 202R, respectively. Boss portions 284a and 284b are provided in a central area of the light guides 208 in the longitudinal direction thereof, and boss portions 284c, 284d, 284e, and 284f are provided on both ends of the light guides 208 in the longitudinal direction thereof. The boss portions 284a, 284b, 284c, 284d, 284e, and 284f may be formed as parts of the light guides 208, or may be manufactured through a separate process from the light guides 208 and fixed thereto using an adhesive. Note that opening portions such as holes, grooves, or slits that correspond to the boss portions 284a and 284b are provided in the metallic plate member 205. These are to ensure that the boss portions 284a and 284b and the metallic plate member 205 do not interfere with each other. The opening portions may be unnecessary depending on the positions of the boss portions 284a and 284b. For example, no opening portions are provided on both ends of the plate member 205 because the boss portions 284c, 284d, 284e, and 284f are present in locations that do not interfere with the metallic plate member 205.

Figure 6:
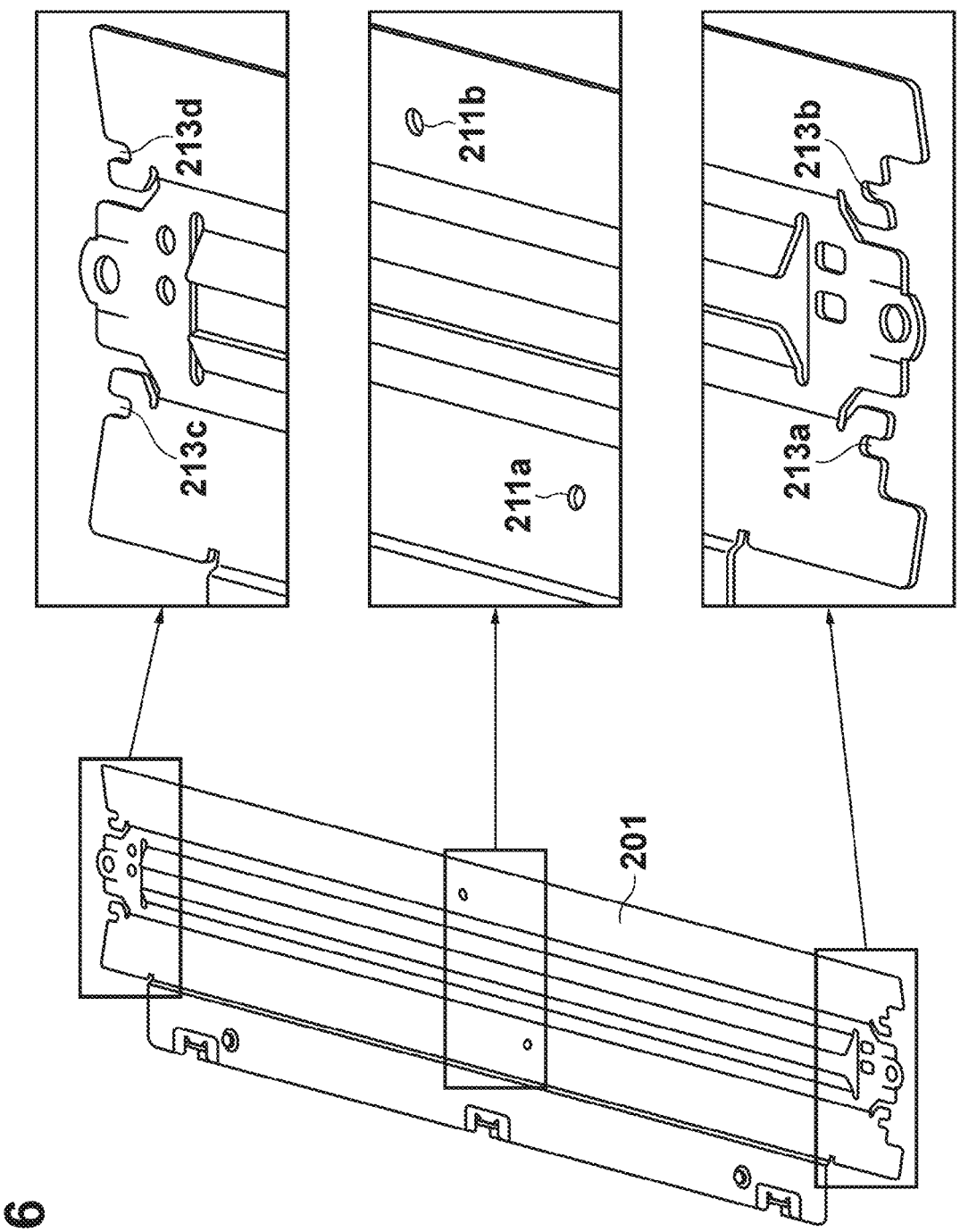
FIG. 6 is a perspective view illustrating a top surface of a base member.

As shown in FIG. 6, round hole portions 211a and 211b are provided near the center of the base member 201, and slit portions 213a, 213b, 213c, and 213d are provided on both ends of the base member 201. When the base member 201 and the light guide units 202L and 202R are combined, the boss portions in the light guide units are aligned with the corresponding opening portions (round hole portions or slit portions) in the base member. The boss portion 284a is fitted into the round hole portion 211a. The boss portion 284b is fitted into the round hole portion 211b. The boss portion 284c is fitted into the slit portion 213a. The boss portion 284d is fitted into the slit portion 213b. The boss portion 284e is fitted into the slit portion 213c. The boss portion 284f is fitted into the slit portion 213d.

As shown in FIG. 7A, ridgelines 271 and 272, which each correspond to one side of each LED substrate 207 of the respective light guide units 202L and 202R parallel to the direction in which the plurality of LEDs are laid out, make contact with top surfaces 218 and 219 of the base member 201, respectively. During assembly, the light guide unit 202L can be pivoted relative to the base member 201 with the ridgeline 271 serving as a center of rotation. Likewise, the light guide unit 202R can be pivoted relative to the base member 201 with the ridgeline 272 serving as a center of rotation. In this manner, the ridgelines 271 and 272 serve both as contact axes (contact lines) and axes of rotation. The light guides 208 rotate in the directions of the dotted line arrows as a result of the light guide units 202L and 202R pivoting with the ridgelines 271 and 272 serving as the axes of rotation. The directions in which light is emitted from the light guides 208 (the optical axes) can be adjusted by pivoting the light guide units 202L and 202R.

As shown in FIG. 7A, bottom surfaces 273 and 274 of the LED substrates 207 are at an angle relative to the top surfaces 218 and 219 of the base member 201. This angle is, for example, 3 to 5°. Due to dimensional tolerances of the respective components, it is possible that the light guides 208 and the base member 201 will interfere with each other when adjusting the amount by which the light guide units 202L and 202R are pivoted. The stated angles are set so that such interference does not occur.

For example, as shown in FIGS. 7A and 7B, the amounts by which the light guide units 202L and 202R are pivoted is adjusted using a tool during assembly, so that the angles (measurement values) of top surfaces 290 and 291 of the light guides 208 in the light guide units 202L and 202R fall within a predetermined range from a design value. Here, the measurement of the angles of the top surfaces 290 and 291 of the light guides 208 is carried out at a plurality of locations in the longitudinal direction (the vertical direction relative to the paper surface in FIG. 7A). The pivot amount of the light guide units 202L and 202R is adjusted so that all of the angles fall within a predetermined range from a design value across the entire range of the longitudinal direction.

When the stated adjustment of the angles is finished, fine adjustments of the angles for the purpose of adjusting a light amount are carried out. As shown in FIG. 8A, a light amount in the Z direction (the upward direction) from a location corresponding to the surface of the original (the surface to be read) is measured at a reading location corresponding to a given location in the longitudinal direction of the light guides.

In FIG. 8B, the horizontal axis represents a distance from the location corresponding to the original surface, whereas the vertical axis represents a light amount ratio. The light amount ratio is a ratio of a measured light amount relative to the light amount at the location corresponding to the original surface. Here, the light amount at the location corresponding to the original surface is taken as 100. Here, the light guide units 202L and 202R are pivoted so that the measured value falls within a range from an upper limit and a lower limit for the design. For example, in the case where the measured value exceeds the upper limit, the light guide units 202L and 202R are pivoted in an R2 direction. Likewise, in the case where the measured value is below the lower limit, the light guide units 202L and 202R are pivoted in an R1 direction. The light amount is measured at a plurality of locations in the longitudinal direction, and fine adjustments are made to the angles of the light guide units 202L and 202R so that the light amounts at all locations fall within the range for the design.

As shown in FIG. 7B, a gap is provided by design between leg portions 292 and 293 of the light guides 208 and top surfaces 220 and 221 of the base member 201. The configuration is the same on the opposite sides of the light guides 208 in the longitudinal direction. The fine adjustment of the angles is realized by adjusting the size of this gap. The light guide units 202L and 202R whose angles have been set are affixed to the base member 201 using an adhesive such as a UV adhesive. The locations of the adhesive are, for example, the locations indicated by the circles 154 in FIG. 3A.

According to the present embodiment, the plurality of LEDs 204 are mounted upon the metallic plate member 205, and thus heat from the plurality of LEDs 204 is transmitted to the metallic plate member 205 and the plate member 205 functions as a heat dissipation plate. Accordingly, a rise in the temperature of the plurality of LEDs 204 can be efficiently suppressed. In addition, the light guides 208 are fixed upon the metallic plate member 205 so that the surfaces of the light guides 208 and the metallic plate member 205 that face each other are parallel to each other. Consequently, the light guides 208 are suppressed from warping. Because the light guides 208 are suppressed from warping, the distance between the light guides 208 and the original is kept at a desired distance, which in turn makes it difficult for fogging, shininess, and so on to occur in the image resulting from the reading.

In the present embodiment, the surfaces of the light guides 208 and the metallic plate member 205 that face each other are fixed using an adhesive member. Consequently, the light guides 208 are suppressed from warping over an extended period of time. In addition, because the material of the light guides 208 (plastic) has a sufficiently lower rigidity than the material of the plate member 205 (metal), warping in the light guides 208 is corrected by the plate member 205. Double-sided tape in which an adhesive compound is applied on both sides, an adhesive, or the like can be employed as the adhesive member. In particular, the double-sided tape can immediately fix the surfaces of the light guides 208 and the metallic plate member 205 that face each other, and is thus advantageous in terms of workability.

In addition, in the present embodiment, the angles of the light guide units 202L and 202R are adjusted in a state in which the light guides 208 are held straight by fixing the light guides 208 to the metallic plate member 205 in this manner. Here, the light guide units 202L and 202R are supported by the base member 201. Of the plurality of surfaces that make up the metallic plate member 205 in the light guide units 202L and 202R, the plurality of LEDs 204 are provided on a first surface. Meanwhile, one side of a second surface, which corresponds to the surface on the opposite side as the first surface, makes contact with the base member 201. The axis of contact between the metallic plate member 205 and the base member 201 is parallel to the longitudinal direction of the light guide units 202L and 202R. According to the present embodiment, the axis of contact is formed by contact between the ridgelines 271 and 272 on the end portions of the metallic plate member 205 that extend in the longitudinal direction and the base member 201. The axis of contact being realized by the ridgelines 271 and 272 is advantageous in that no special processing need be performed on the base member 201. The optical axes (angles) of the light guides 208 are adjusted by pivoting the light guide units 202L and 202R relative to the base member 201 using the axis of contact as the rotational axis. Meanwhile, fine adjustments can be made to the angles by adjusting the gap that arises between the metallic plate member 205 and the base member 201. At this time, the gap is adjusted by measuring the light amount at several locations along the longitudinal direction of the light guide units 202L and 202R so that image problems such as fogging, shininess, and so on do not easily arise. The light guide units 202L and 202R are then fixed to the base member 201 using an adhesive or the like while maintaining the stated gap.

Shape of Base Portion 201

Although the ridgelines 271 and 272 at the longitudinal ends of the LED substrate 207 are indicated as being an axis of contact (rotational axis) in FIG. 7A, an axis of contact may be provided at another location. As shown in FIG. 9, rib portions 223 and 224 may be provided as protruding portions that protrude toward the LED substrate 207 in the longitudinal direction of the base member 201. The bottom surfaces 273 and 274 of the LED substrate 207 make contact with the rib portions 223 and 224. Accordingly, the angles of the light guide units 202L and 202R relative to the base member 201 can be adjusted using contact portions (contact axes 275 and 276) that extend linearly in the longitudinal direction of the base member 201 as rotational centers.

The configuration illustrated in FIG. 9 makes it easier to ensure the straightness, in the longitudinal direction, of the areas where the base member 201 and the LED substrate 207 make contact, as compared to the configuration illustrated in FIG. 7A. With respect to the base member 201 illustrated in FIG. 7A, it is necessary to achieve the straightness on the top surfaces 218 and 219. However, with the base member 201 illustrated in FIG. 9, the straightness needs to be achieved only at the locations of the rib portions 223 and 224. Accordingly, it can be said that the configuration illustrated in FIG. 9 makes it easier to ensure straightness than the configuration illustrated in FIG. 7A.

Fixing of LED Substrate 207 and Light Guides 208

Figures 10A, 10B:
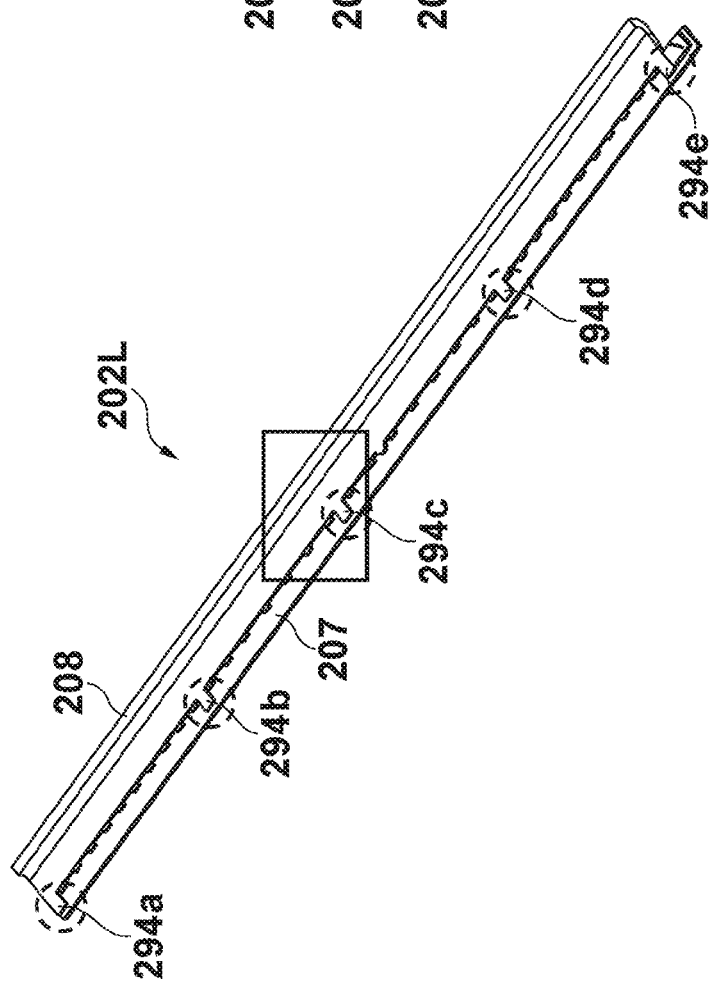
FIGS. 10A and 10B are diagrams illustrating a procedure for fixing the light guide to a plate member.

Although FIG. 4D illustrates the LED substrate 207 and the light guides 208 as being fixed using the double-sided tape 209, another fixing method may of course be employed. As shown in FIG. 10A, flange parts 294a, 294b, 294c, 294d, and 294e that protrude along the top portion of the LED substrate 207 are provided in the light guides 208. Furthermore, as shown in FIG. 10B, an adhesive (a UV adhesive or the like) is applied along a bold dotted line portion 301. Accordingly, the flange part 294c of the light guides 208 can be affixed to the top surface of the LED substrate 207. The other flange parts 294a, 294b, 294d, and 294e are fixed to the top surface of the LED substrate 207 in the same manner.

In this manner, the one or more flange part 294c is provided at an end of the light guides 208 extending in the longitudinal direction thereof that faces the plurality of LEDs 204, and the flange part 294c is then fixed to the metallic plate member 205. Compared to the fixing method illustrated in FIGS. 4A through 4D, which uses the double-sided tape 209, the fixing method illustrated in FIGS. 10A and 10B, which uses an adhesive, is advantageous in terms of a reduction in the number of assembly steps as well as from the standpoint of automation. This is because the double-sided tape 209 requires processes for removing backing paper, applying the tape, and so on.

Fixing of LED Substrate 207 and Light Guides 208

Figure 11:
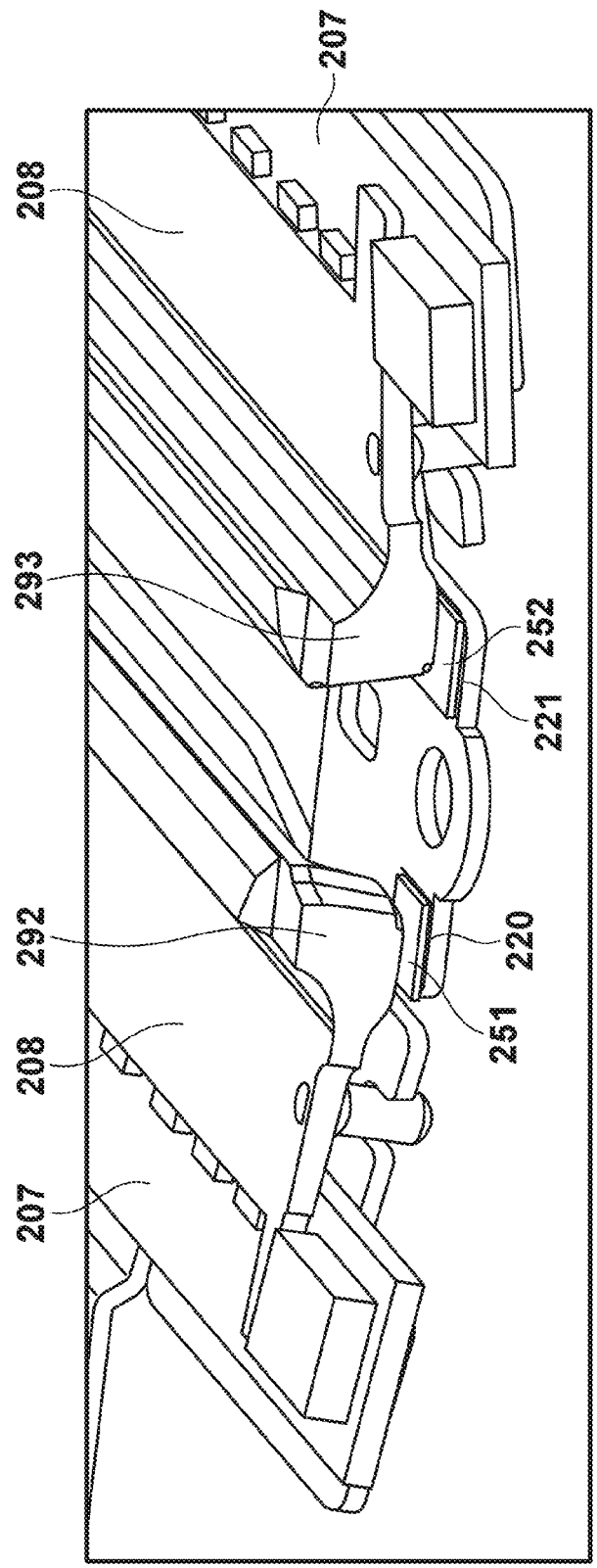
FIG. 11 is a diagram illustrating a procedure for adjusting the position of the light guide unit using sheet members.

FIG. 7B illustrates the adjustment of the angles of the light guide units 202L and 202R relative to the base member 201 by providing a gap between the leg portions 292 and 293 of the light guides 208 and the top surfaces 220 and 221 of the base member 201 and then adjusting that gap. However, sheet members 251 and 252 may be interposed between the leg portions 292 and 293 of the light guides 208 and the top surfaces 220 and 221 of the base member 201, as shown in FIG. 11. Note that the sheet members 251 and 252 are fixed to the top surfaces 220 and 221 of the base member 201 using double-sided tape, an adhesive, or the like. The gap can then be adjusted by adjusting the number of sheet members 251 and 252, selecting the sheet members 251 and 252 that have appropriate thicknesses from among sheet members that have different respective thicknesses, and so on. Furthermore, the sheet members 251 and 252 can be fixed to the leg portions 292 and 293 of the light guides 208 while using the sheet members 251 and 252 to maintain the size of the gap with certainty. A UV adhesive may be used for this fixing as well. In this manner, the height of the gap may be maintained by arranging the sheet members 251 and 252, which serve as height adjustment members, in the gap.

With the fixing method illustrated in FIG. 11, the adhesion takes place with the light guides 208 and the base member 201 coming in contact with each other. Accordingly, a higher adhesion strength can be ensured as compared to the fixing method illustrated in FIG. 7B. This method is also advantageous in that shifting in the adjustment, which can occur due to vibrations imparted during transport, can be suppressed.

Influence from Differences in Expansion Coefficients of Light Guides 208 and Base Portion 201

Incidentally, original reading apparatuses are exported to and used in various countries around the world. For example, there are cases where original reading apparatuses shipped from a factory are transported by a transport ship to areas near the equator. It is not uncommon for temperatures near the bottom of a transport ship to reach 50°. The material of the light guides 208 is a plastic and the material of the plate member 205, the base member 201, and so on is a metal, and as a result, the thermal expansion coefficients thereof are different from each other. As described above, warping in the z direction can be suppressed to an extent by fixing the light guides 208 to the plate member 205. However, it is also necessary to take into consideration the influence of expansion in the x direction, the y direction, and so on in high-temperature, high-humidity environments. Accordingly, in the present embodiment, the influence of expansion is reduced by altering the method of fixing the light guides 208 to the base member 201.

Figure 12A:
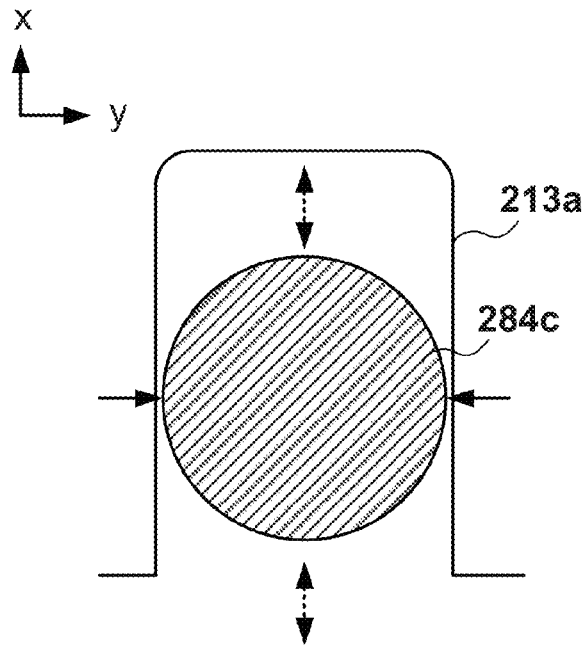
FIG. 12A is an enlarged view of a slit portion and a boss portion.
Figure 12B:
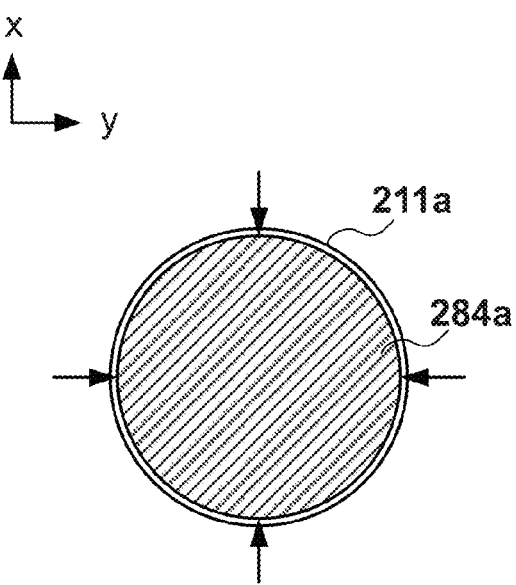
FIG. 12B is an enlarged view of a round hole portion and a boss portion.

FIG. 12A illustrates an enlarged view of the slit portion 213a and the boss portion 284c illustrated in FIG. 6. The slit portions 213b through 213d and the boss portions 284d through 284f have the same configurations. FIG. 12B illustrates an enlarged view of the round hole portion 211a and the boss portion 284a illustrated in FIG. 6. The round hole portion 211b and the boss portion 284b have the same configuration.

As shown in FIG. 12A, the sides of the slit portion 213b have different lengths in the x direction and the y direction. The length of the sides in the x direction is greater than the length of the sides in the y direction. In other words, the shape of the opening in the slit portion 213b is generally rectangular. Accordingly, the slit portion 213a and the boss portion 284c are engaged in the y direction, but are not engaged in the x direction. Note that "engaged" includes not only cases where there is complete contact, but also a state in which there is a certain degree of play (a margin) between the portions. In this manner, the slit portion 213a and the boss portion 284c are supported at two points in the y direction, but are not supported in the x direction, and thus are capable of movement.

On the other hand, as shown in FIG. 12B, the round hole portion 211a and the boss portion 284a are engaged in both the x direction and the y direction. As illustrated in FIG. 6, the round hole portion 211a is arranged in the central area of the base member 201 in the longitudinal direction thereof. The boss portion 284a is arranged in the central area of the light guide 208 in the longitudinal direction thereof. In other words, the light guides 208 are fixed to the base member 201 central to the central area in the main scanning direction (the longitudinal direction) thereof. Meanwhile, the ends of the light guides 208 are supported in the lateral direction of the light guides 208, but are free in the longitudinal direction of the light guides 208. Accordingly, shifting between the light guides 208 and the base member 201 due to differences in the expansion coefficients thereof in high-temperature, high-humidity environments only occurs along approximately half the length in the longitudinal direction. Consequently, the amount by which the light guides 208 warp can be suppressed.

Differences between the lengths of the LED substrate 207 and the light guides 208 arise due to expansion. However, in the present embodiment, the LED substrate 207 and the light guides 208 are not fixed in a rigid manner, and are instead fixed in an elastic manner using the double-sided tape 209. Accordingly, because shifting between the LED substrate 207 and the light guides 208 occurs in the longitudinal direction (the x direction), shifting (warping) in the z direction is suppressed. This also suppresses shifts in the optical axis and so on. Note that an adhesive that retains elasticity even after curing may be employed instead of the double-sided tape 209. These will be referred to collectively as "elastic adhesives".

In this manner, of the plurality of boss portions, the boss portions 284a and 284b arranged in the central areas of the light guides 208 are fitted into the round hole portions 211a and 211b provided in the base member 201. Accordingly, the boss portions 284a and 284b are supported in both the longitudinal direction (the x direction) and the lateral direction (the y direction) of the light guides 208. Meanwhile, the boss portions 284c through 284f that are arranged at the ends of the light guides 208 are supported by the corresponding slit portions 213a through 213d in the lateral direction (the y direction) of the light guides 208. Accordingly, the light guides 208 expand in the longitudinal direction central to the vicinity of the center of the light guides 208. Consequently, the amount by which the light guides 208 warp in the z direction can be suppressed.

Change in Light Amount Depending on Position of Boss Portion

In the present embodiment, a plurality of boss portions for supporting the light guides 208 are employed. However, because the boss portions are formed as part of the light guides 208, there are cases where the passage of light is impeded in the vicinity of the boss portions, the direction in which the light propagates deviates from a desired direction due to unnecessary reflection, and so on. This acts as a cause of unevenness in the light amount at the image reading position. Accordingly, in the present embodiment, the boss portions are arranged in positions that are shifted from the path in which the light propagates, which makes it difficult for such light amount unevenness to occur.

Figure 13A:
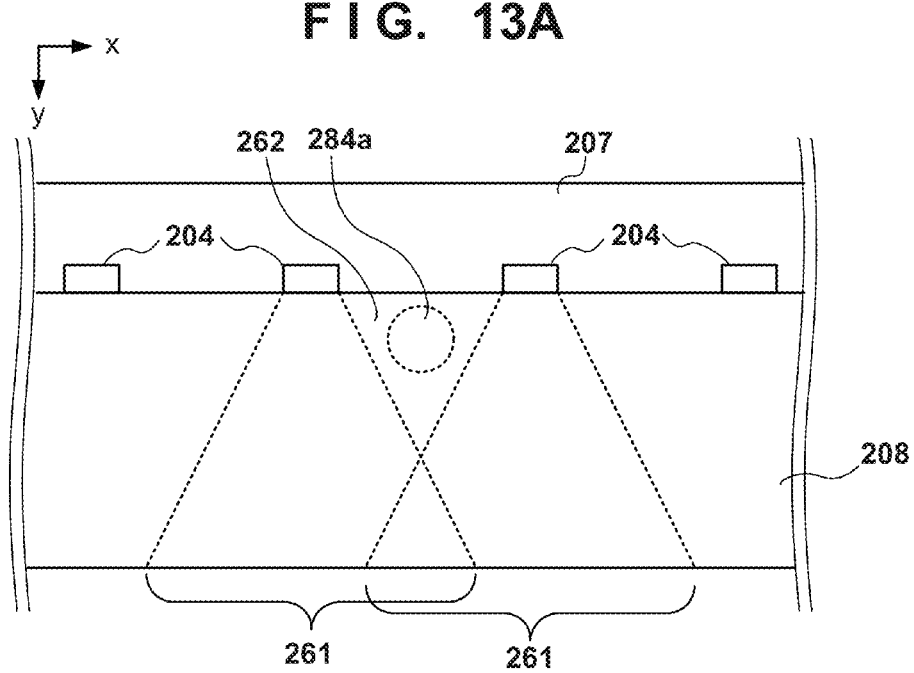
FIGS. 13A and 13B are diagrams illustrating a boss portion arranged in a location that does not easily interfere with the propagation of light.
Figure 13B:
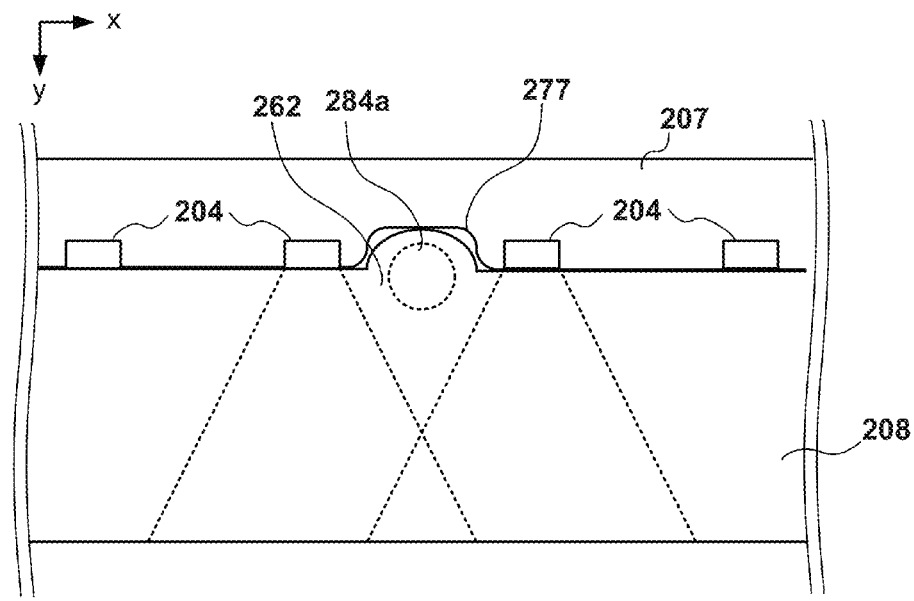

FIGS. 13A and 13B illustrate a boss portion 284a arranged in a position that makes it difficult for the boss portion to impede the propagation of light. Note that the boss portion 284b is arranged in the same manner as the boss portion 284a. The boss portion 284a, which serves as a reference for positioning the light guide 208, is arranged near the center of an area between two adjacent LEDs 204. In other words, the boss portions 284a and 284b are arranged at positions that are approximately equal distances from two adjacent LEDs 204. Light that has been emitted from the light-emitting surfaces of the LEDs 204 propagates in a fan shape, as indicated by the broken lines in FIGS. 13A and 13B. This area will be referred to as a light propagation region 261. On the other hand, a non-propagation region 262 that is not used in the propagation of light is present near the center of the area between two adjacent LEDs 204. Accordingly, if the boss portion is arranged in the non-propagation region 262, it is difficult for light amount unevenness to occur, and at the same time, the boss portion can support the light guide 208.

In the case where a non-propagation region 262 that has a sufficient surface area is not present, a cutout 277 may be provided in the LED substrate 207, as shown in FIG. 13B. Furthermore, a portion of the light guide 208 may be cause to protrude further backward than the light-entry surfaces 281 of the LEDs 204, and the boss portion 284a may be arranged in the protruding portion. Through this, part or all of the boss portion 284a is housed within the cutout 277 in the cross-sectional direction of the boss portion 284a. The method of arranging the boss portion 284a illustrated in FIG. 13B is useful in the case where a sufficient width in the y direction (the lateral direction) of the light guide 208 cannot be secured. In other words, according to this arrangement method, the original reading apparatus can be further miniaturized in the y direction. In the aforementioned embodiment, the boss portion is arranged so as to not completely enter into the non-propagation region. However, if the light amount unevenness, light amount loss, or the like of a permissible extent, part of the boss portion may be present within the non-propagation region. Note that the degree of light amount unevenness, light amount loss, or the like that is permissible depends on the reading capabilities required by design in the original reading apparatus. In this manner, in the present invention, the boss portion is not intentionally excluded from being partially present in the non-propagation region.

Figure 14:
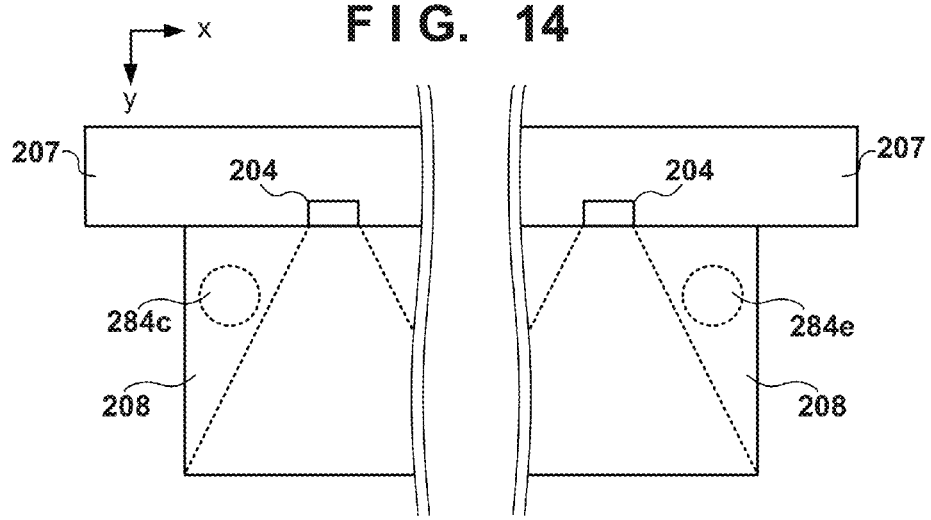
FIG. 14 is a diagram illustrating the arrangement of boss portions near the ends of the light guide in the longitudinal direction thereof.

FIG. 14 illustrates the arrangement of boss portions in the vicinity of the end portions of the light guide 208 in the longitudinal direction (the x direction) thereof. In the present embodiment, all of the boss portions are arranged in the non-propagation regions of light. As shown in FIG. 14, the boss portions 284c and 284e on either side of the light guide 208 are arranged further outward than the LEDs 204 that, of the plurality of LEDs 204, are located furthest toward the ends of the LED substrate 207 in the longitudinal direction thereof. Consequently, it is difficult for the propagation of light emitted from the LEDs 204 furthest toward the ends to be impeded, which makes it difficult for light amount unevenness to occur.

Figure 15:
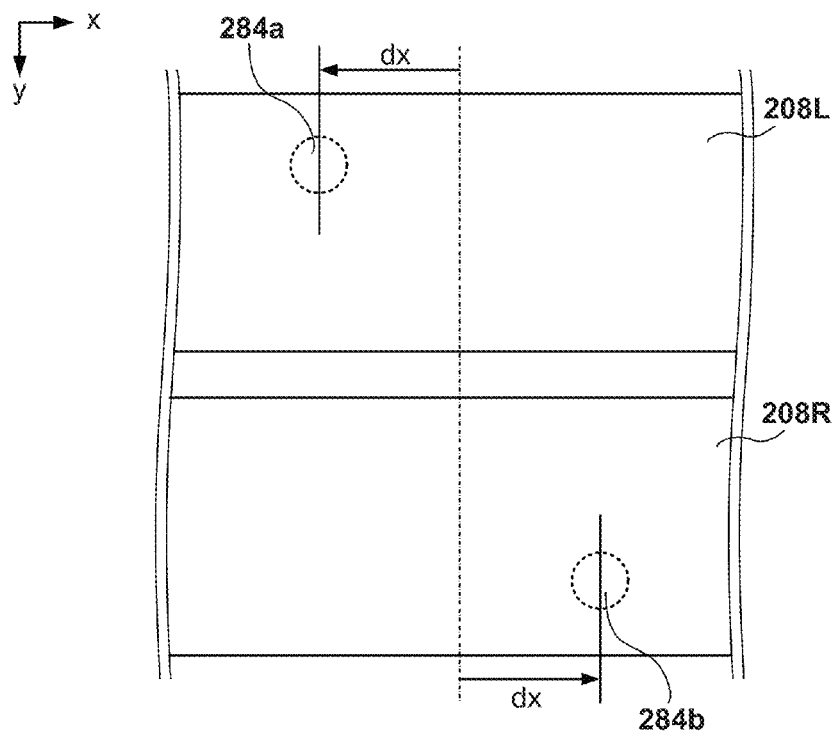
FIG. 15 is a diagram illustrating respective light guides in two light guide units.

FIG. 15 illustrates light guides 208L and 208R of the respective first light guide unit 202L and the second light guide unit 202R. As described using FIG. 7A, the first light guide unit 202L and the second light guide unit 202R are arranged facing each other with an original reading position located therebetween.

Here, the dot-dash line shown in the center of FIG. 15 indicates a center line that divides the light guides 208L and 208R halfway along the longitudinal direction thereof. The light guides 208L and 208R are arranged symmetrically on either side of the optical axis. Here, the boss portion 284a in the vicinity of the center of the light guide 208L and the boss portion 284b in the vicinity of the center of the light guide 208R are both assumed to be arranged upon the center line. In this case, the light guides 208L and 208R are both susceptible to the same influence of the light amount unevenness, and as a result, the light amount unevenness may be emphasized at the original reading position.

Accordingly, the boss portion 284a of the light guide 208L and the boss portion 284b of the light guide 208R are arranged so as to be offset from the center line in the longitudinal direction. In other words, at least one of the boss portions arranged in a central area of the light guide 208L and at least one of the boss portions arranged in a central area of the light guide 208R are arranged so as to be shifted in the longitudinal direction of the light guide unit 202L and the light guide unit 202R. In this example, the boss portion 284a is offset by an amount −dx, whereas the boss portion 284b is offset by an amount +dx. Although the respective offset amounts are equal, and simply have different signs, the offset amounts may be different. Setting the offset amounts of the boss portion 284a and the boss portion 284b to the same amounts makes it possible to use the same components for the light guides 208L and 208R. That is, the components can be mass-produced, which is advantageous in terms of costs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-095020, Apr. 18, 2012 which is hereby incorporated by reference herein in its entirety.

What is claimed is:

1. An original reading apparatus comprising:
a platen on which an original is placed;
an illumination unit configured to illuminate the original ; and
a photoelectric conversion element configured to convert reflected light from the original illuminated by the illumination unit into an electrical signal,
wherein the illumination unit includes:
a plurality of light-emitting elements;
a base member; and
a light guide having a first boss portion and second boss portions that engage with the base member, configured to guide light emitted from the plurality of light-emitting elements toward the original;
wherein the first boss portion arranged in a central area of the light guide in the longitudinal direction is supported in both the longitudinal direction and the lateral direction of the light guide; and
wherein the second boss portions arranged on end areas of the light guide in the longitudinal direction are free in the longitudinal direction of the light guide and are supported in the lateral direction of the light guide.

2. The original reading apparatus according to claim 1, wherein the longitudinal direction of the light guide matches the direction in which the plurality of light-emitting elements are laid out.

3. The original reading apparatus according to claim 1, wherein the light guide is fixed to the base member so that a light incident surface of the light guide and light-emitting surfaces of the plurality of light-emitting elements face each other.

4. The original reading apparatus according to claim 3, wherein the first boss portion is arranged closer to the light incident surface of the light guide than the second boss portions .

5. The original reading apparatus according to claim 1, wherein an opening provided in the base member with which the first boss portion is engaged is a hole.

6. The original reading apparatus according to claim 1, wherein the longitudinal direction is a direction parallel to the direction in which the plurality of light-emitting elements are laid out; and
the lateral direction is a direction orthogonal to the longitudinal direction 7. The original reading apparatus according to claim 1, wherein an number of the first boss portion is one and an number of the second boss portion is two.

8. An original reading apparatus comprising:
a platen on which an original is placed;
an illumination unit configured to illuminate the original; and
a photoelectric conversion element configured to convert reflected light from the original illuminated by the illumination unit into an electrical signal,
wherein the illumination unit includes:
a base member; and
a light guide, provided with a plurality of boss portions that engage with the base member, configured to guide light outputted from a plurality of light-emitting elements mounted in array form toward the original; and
wherein of the plurality of boss portions, at least one of the boss portions is arranged in a non-propagation region of the light guide that is outside of a propagation region in which light outputted from the plurality of light-emitting elements propagates;
the plurality of light-emitting elements are arranged in a straight line upon a plate member;
the light guide is arranged upon the plate member so that a light-entry surface of the light guide and light-emitting surfaces of the plurality of light-emitting elements face each other; and
a cutout configured to receive the at least one boss portion is provided in the plate member.

9. The original reading apparatus according to claim 8, wherein the at least one of the plurality of boss portions is arranged in a position that is equal distances from two adjacent light-emitting elements of the plurality of light-emitting elements.

10. The original reading apparatus according to claim 8, wherein the light guide is fixed to the plate member using an elastic adhesive.

11. An original reading apparatus comprising:
a platen on which an original is placed;
an illumination unit configured to illuminate the original; and
a photoelectric conversion element configured to convert reflected light from the original illuminated by the illumination unit into an electrical signal,
wherein the illumination unit includes:
a base member; and
a light guide, provided with a plurality of boss portions that engage with the base member, configured to guide light outputted from a plurality of light-emitting elements mounted in array form toward the original; and
wherein of the plurality of boss portions, at least one of the boss portions is arranged in a non-propagation region of the light guide that is outside of a propagation region in which light outputted from the plurality of light-emitting elements propagates, and the at least one of the plurality of boss portions is arranged further outward in the longitudinal direction of the light guide than the light-emitting elements that, of the plurality of light-emitting elements, are positioned furthest toward the ends of the light guide in the longitudinal direction thereof 12. An original reading apparatus comprising:
a platen on which an original is placed;
an illumination unit configured to illuminate the original; and
a photoelectric conversion element configured to convert reflected light from the original illuminated by the illumination unit into an electrical signal,
wherein the illumination unit includes:
a base member; and
a light guide, provided with a plurality of boss portions that engage with the base member, configured to guide light outputted from a plurality of light-emitting elements mounted in array form toward the original; and
wherein of the plurality of boss portions, at least one of the boss portions is arranged in a non-propagation region of the light guide that is outside of a propagation region in which light outputted from the plurality of light-emitting elements propagates, and
wherein the illumination unit includes:
a first light guide unit; and
a second light guide unit,
wherein the first light guide unit and the second light guide unit each have the boss portions and the plurality of light-emitting elements, and are arranged so as to face the position in which the original is read; and the at least one boss portion arranged in a central area of the light guide in the first light guide unit and the at least one boss portion arranged in a central area of the light guide in the second light guide unit are arranged so as to be shifted relative to each other in the longitudinal direction of the first light guide unit and the second light guide unit.

13. The original reading apparatus according to claim 12, wherein an amount by which the at least one boss portion arranged in a central area of the light guide in the first light guide unit is offset from the center of the first light guide unit in the longitudinal direction thereof and an amount by which the at least one boss portion arranged in a central area of the light guide in the second light guide unit is offset from the center of the second light guide unit in the longitudinal direction thereof are the same amounts.

14. The original reading apparatus according to claim 12, wherein of the plurality of boss portions, at least one boss portion arranged in a central area of the light guide is fitted into a hole portion provided in the base member, and is supported in both the longitudinal direction and the lateral direction of the light guide; and of the plurality of boss portions, one boss portion arranged on an end of the light guide is free in the longitudinal direction of the light guide and is supported in the lateral direction of the light guide.

15. The original reading apparatus according to claim 14, wherein the shape of the opening of the hole portion is rectangular.

16. The original reading apparatus according to claim 14, wherein the longitudinal direction is a direction parallel to the direction in which the plurality of light-emitting elements are laid out; and the lateral direction is a direction orthogonal to the direction in which the plurality of light-emitting elements are laid out.

\* \* \* \* \*